US009575895B2

(12) United States Patent
Liu et al.

(10) Patent No.: US 9,575,895 B2
(45) Date of Patent: *Feb. 21, 2017

(54) PROVIDING COMMON CACHING AGENT FOR CORE AND INTEGRATED INPUT/OUTPUT (IO) MODULE

(71) Applicant: Intel Corporation, Santa Clara, CA (US)

(72) Inventors: Yen-Cheng Liu, Portland, OR (US); Robert G. Blankenship, Tacoma, WA (US); Geeyarpuram N. Santhanakrishnan, Mercer Island, WA (US); Ganapati N. Srinivasa, Portland, OR (US); Kenneth C. Creta, Gig Harbor, WA (US); Sridhar Muthrasanallur, Bangalore (IN); Bahaa Fahim, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/609,620

(22) Filed: Jan. 30, 2015

(65) Prior Publication Data

US 2015/0143051 A1 May 21, 2015

Related U.S. Application Data

(63) Continuation of application No. 13/324,053, filed on Dec. 13, 2011, now Pat. No. 8,984,228.

(51) Int. Cl.
*G06F 12/08* (2016.01)

(52) U.S. Cl.
CPC ......... *G06F 12/084* (2013.01); *G06F 12/0815* (2013.01); *G06F 12/0831* (2013.01); *G06F 2212/452* (2013.01); *G06F 2212/621* (2013.01); *Y02B 60/1225* (2013.01)

(58) Field of Classification Search
CPC ..... G06F 12/0831; G06F 12/0815; G06F 12/084; G06F 2212/452; G06F 2212/621
See application file for complete search history.

(56) References Cited

U.S. PATENT DOCUMENTS

| 6,009,488 A | 12/1999 | Kavipurapu |
|---|---|---|
| 7,165,131 B2 | 1/2007 | Creta |
| 7,210,000 B2 | 4/2007 | Creta |
| 7,689,778 B2 | 3/2010 | Liu et al. |
| 7,937,534 B2 | 5/2011 | Madukkarumukumana |

(Continued)

OTHER PUBLICATIONS

Intel Corporation, "An Introduction to the Intel QuickPath Interconnect," Jan. 2009, pp. 1-22.

(Continued)

*Primary Examiner* — Edward Dudek, Jr.
(74) *Attorney, Agent, or Firm* — Trop, Pruner & Hu, P.C.

(57) ABSTRACT

In one embodiment, the present invention includes a multicore processor having a plurality of cores, a shared cache memory, an integrated input/output (IIO) module to interface between the multicore processor and at least one IO device coupled to the multicore processor, and a caching agent to perform cache coherency operations for the plurality of cores and the IIO module. Other embodiments are described and claimed.

17 Claims, 7 Drawing Sheets

(56) References Cited

U.S. PATENT DOCUMENTS

| | | | |
|---|---|---|---|
| 8,984,228 B2* | 3/2015 | Liu | G06F 12/0831 |
| | | | 711/130 |
| 2004/0139283 A1* | 7/2004 | Arimilli | G06F 12/0835 |
| | | | 711/146 |
| 2006/0053258 A1 | 3/2006 | Liu | |
| 2006/0085602 A1 | 4/2006 | Huggahalli et al. | |
| 2007/0150664 A1 | 6/2007 | Dombrowski et al. | |
| 2008/0320236 A1* | 12/2008 | Ueda | G06F 12/0831 |
| | | | 711/146 |
| 2010/0274975 A1 | 10/2010 | Sistla et al. | |
| 2011/0153924 A1 | 6/2011 | Vash et al. | |
| 2011/0191542 A1 | 8/2011 | Vash et al. | |

OTHER PUBLICATIONS

International Searching Authority, "Notification of Transmittal of the International Search Report and the Written Opinion of the International Searching Authority," mailed May 1, 2013, in International application No. PCT/US2012/069018.

* cited by examiner

PROVIDING COMMON CACHING AGENT FOR CORE AND INTEGRATED INPUT/OUTPUT (IO) MODULE

This application is a continuation of U.S. patent application Ser. No. 13/324,053, filed Dec. 13, 2011, the content of which is hereby incorporated by reference.

BACKGROUND

In modern multiprocessor (MP)-socket computer systems, various topologies are possible. Such systems often include many different semiconductor components realized as integrated circuits (ICs). The ICs include processors, memories, chipsets, input/output hubs (IOHs) and so forth.

As process nodes advance, greater amounts of functionality can be incorporated into a single semiconductor die. One integration trend is to integrate an IO component such as functionality of an IOH into a central processing unit (CPU) die. The main motivation for doing so is to reduce the bill of material (BOM) cost of a computer system, and enable small form factors while reducing overall power consumption.

But problems arise once an IO component is integrated on the same chip with a multiprocessor. Traditional IO integration treats the IO component as a separate caching agent, meaning that dedicated logic is associated with the IO component to handle cache coherency operations. When an IO agent is performing read/write operations to main memory, it has to snoop the CPU side cache to maintain cache coherency. In MP systems, this becomes a major scaling problem. For example, in an 8 socket system, there are effectively 16 caching agents in the system, which can degrade performance. And the efforts to scale up a system to support these many caching agents are not trivial.

DETAILED DESCRIPTION

In various embodiments, an IO agent can be integrated into a multiprocessor socket such as a multicore processor for use in a MP server system, while avoiding scaling issues. More specifically, a CPU caching agent can be configured to support both CPU traffic and IO traffic as well, thereby resolving the scaling issue. Performance can be enhanced by bringing the IO agent and CPU core(s) closer. This IO agent includes functionality to provide an interface between one or more peripheral devices coupled to the processor by off-chip links such as Peripheral Component Interconnect Express (PCIe™) links, and may take the place of a separate chipset component such as an IOH.

Figure 1:
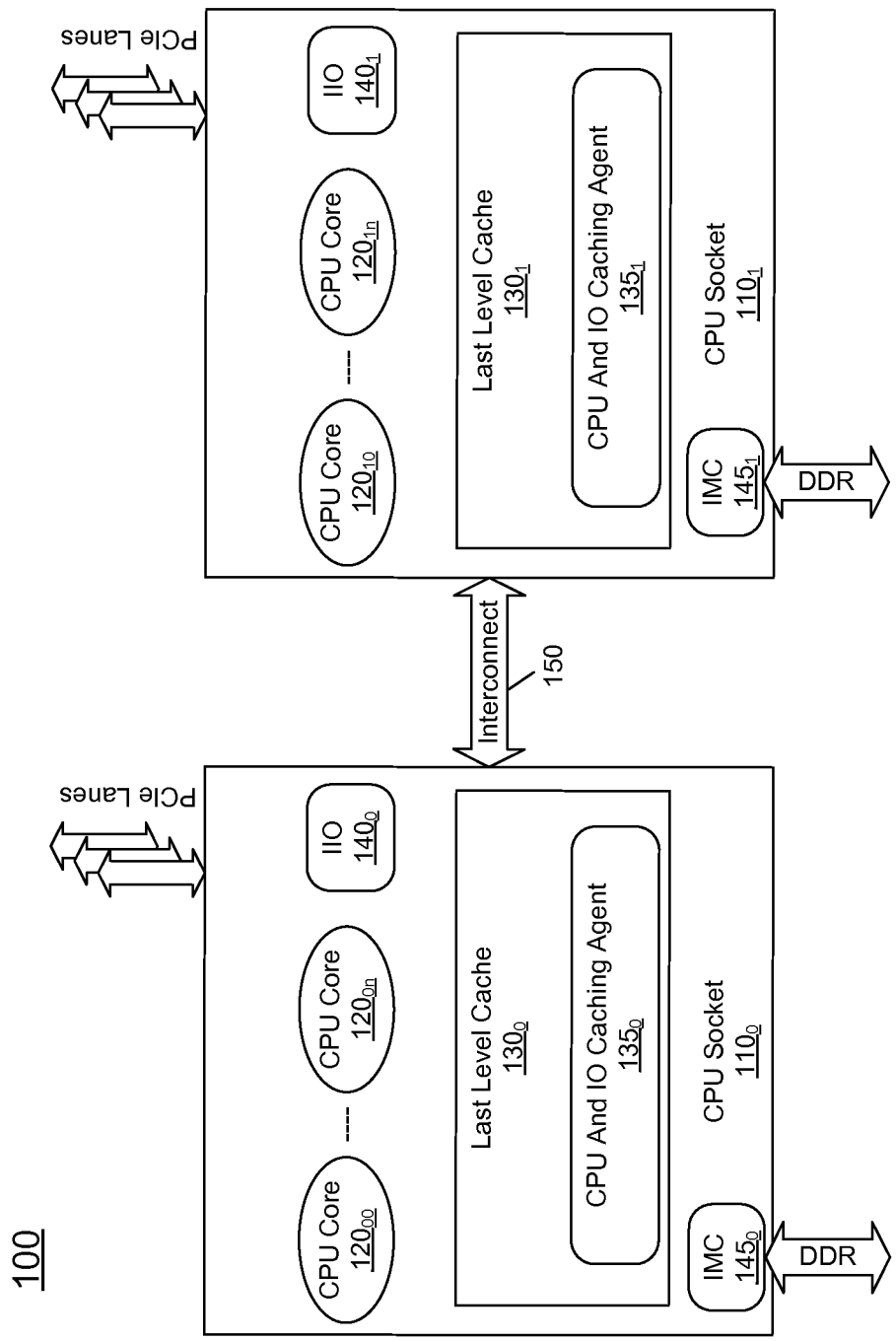
FIG. 1 is a block diagram of a portion of a multiprocessor system in accordance with an embodiment of the present invention.

Referring to FIG. 1, shown is a block diagram of a portion of a multiprocessor system in accordance with an embodiment of the present invention. As shown in FIG. 1, system 100 includes a pair of processor sockets $110_0$ and $110_1$. In the embodiment shown, each socket 110 (generally) corresponds to a multicore processor. For ease of discussion, reference will be made to the components within socket $110_0$. In the embodiment of FIG. 1, socket $110_1$ may be identically configured. However, understand that in other embodiments, heterogeneous processor sockets may be present.

As seen, socket $110_0$ includes a plurality of cores $120_{00}$-$120_{0n}$. As examples, socket $110_0$ can include 4, 8, or another such number of cores. Each of the cores can include various components including a processor pipeline having multiple stages such as a front end unit, one or more execution units, and a back end unit. In addition, one or more levels of cache memories can be present within the cores. Each of cores 120 may be coupled to a shared cache memory $130_0$, which may be a last level cache (LLC). As seen, LLC 130 can include a caching agent $135_0$. In various embodiments, this caching agent may be a combined caching agent both for the CPU as well as for an integrated IO agent. More specifically, socket $110_0$ may include an IO module (hereafter an integrated IO module or IIO module). This IIO module may act as an interface to one or more off-chip peripheral or IO devices (not shown in FIG. 1) coupled to the processor, e.g., via PCIe™ links Examples of such IO devices include storage devices, network interfaces, graphics cards, and so forth.

As further seen, socket $110_0$ may include an integrated memory controller (IMC) $145_0$ to provide an interface to a system memory (not shown for ease of illustration) via a memory interconnect. Socket $110_1$ includes similar components and can be coupled to socket $110_0$ via an interconnect 150, which in one embodiment can be a point-to-point (PtP) link in accordance with a Intel® Quick Path Interconnect (QPI) protocol.

Figure 2:
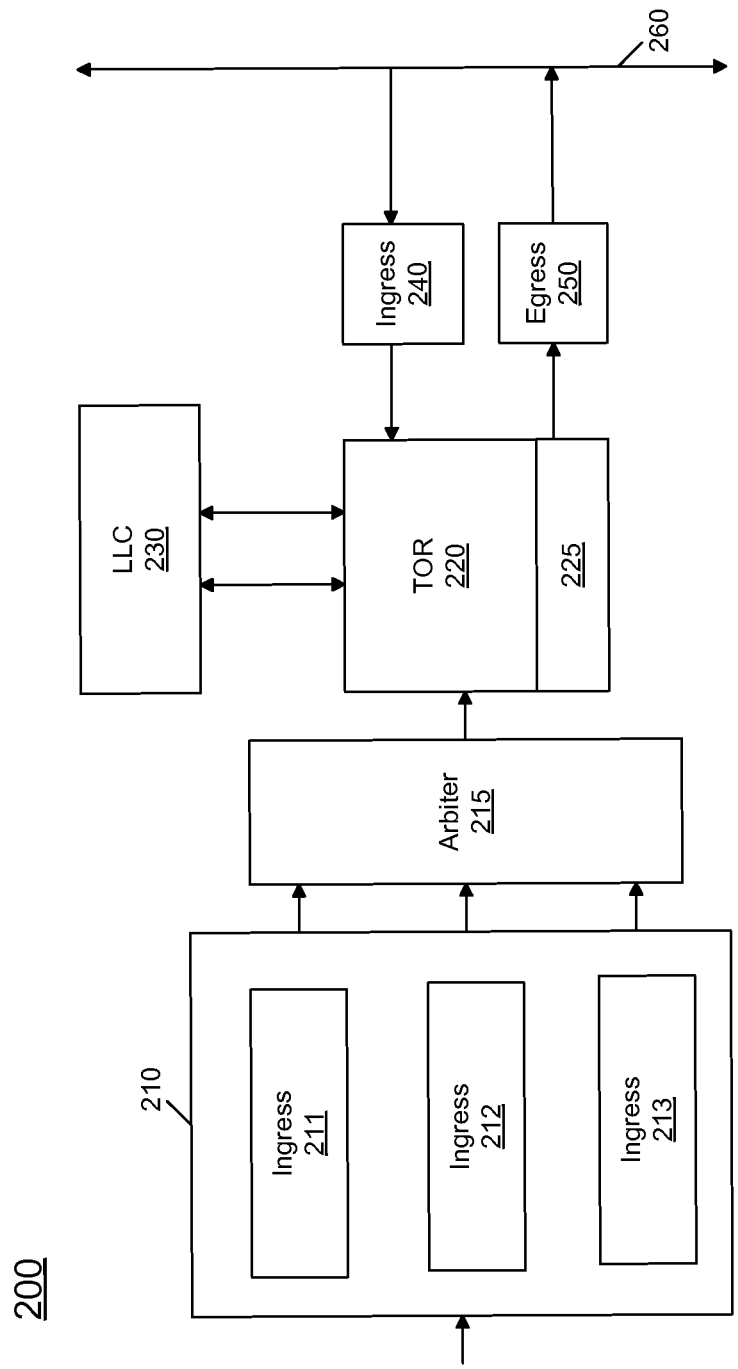
FIG. 2 is a block diagram of a caching agent in accordance with an embodiment of the present invention.

Referring now to FIG. 2, shown is a block diagram of a caching agent in accordance with an embodiment of the present invention. As shown in FIG. 2, caching agent 200 may be logic interposed between one or more cores of a processor and a LLC 230. In addition, caching agent 200 may also provide an interface between an IIO module within a multicore processor and the LLC. As seen, caching agent 200 can include an ingress port 210 that includes multiple ingress queues 211-213. As seen, ingress port 210 may be coupled to an arbiter 215 which can arbitrate amongst incoming requests and provide them to a table of requests (TOR) 220. As seen, TOR 220 may be a buffer or other temporary storage for holding incoming requests. In the embodiment shown, TOR 220 may include at least one dedicated resource 225 for posted transactions. In one embodiment, dedicated resource 225 may be a single entry of the queue, although the scope of the present invention is not limited in this regard.

Still referring to FIG. 2, TOR 220 interfaces with LLC 230. More specifically, this LLC may be a bank or other portion of the LLC associated with the caching agent. To provide access to other locations within the processor via a ring interconnect 260, an ingress queue 240 and an egress queue 250 may be provided. Thus via caching agent 200, cores of the processor and an IIO module can maintain coherency without the need for additional caching agents. Although not shown for ease of illustration, understand that caching agent 200 may further include various coherency logic to perform cache coherency operations on behalf of the cores and IIO module, and to enable coherent access with regard to both the core transactions and IO device transactions as described herein.

Note that although a single structure is shown in FIG. 2 for ease of illustration, understand that a caching agent can be distributed such that each of different portions of the caching agent can be associated with a corresponding core and LLC bank or slice.

With this approach, the IIO module proxies through the CPU caching agent to access memory or other IO devices, therefore reducing the overhead of allocating dedicated resources for an integrated IO caching agent. This also reduces the amount of snoop traffic needed since a reduced number of caching agents per system can be realized. Thus in various embodiments, a system can include a single caching agent per multicore processor socket, where each socket includes multiple cores and an IIO module.

Embodiments also provide an IO performance enhancement. More specifically, since this IIO module is much closer to an internal CPU cache such as a LLC, an IO device supported by the IIO module can directly "push" coherent data into this cache where any processor core within the same socket can have a very fast path to access the data. This is opposed to the conventional approach where an off-chip IO device must issue a direct cache access (DCA) hint to a processor core to cause a cache line to be brought into the LLC. To this end, an IO device coupled to an IIO module in accordance with an embodiment of the present invention can generate an allocating transaction that can lodge data directly into the LLC.

In this way IO data can be brought closer to the CPU cache, providing a more efficient mechanism to lodge data from an IO device directly into a LLC of a processor and without the need for first storing the data in a system memory, reducing bandwidth consumption. Still further, the need for a direct cache hint from the IO device to a core to cause a read request to obtain the data can be avoided.

Figure 3:
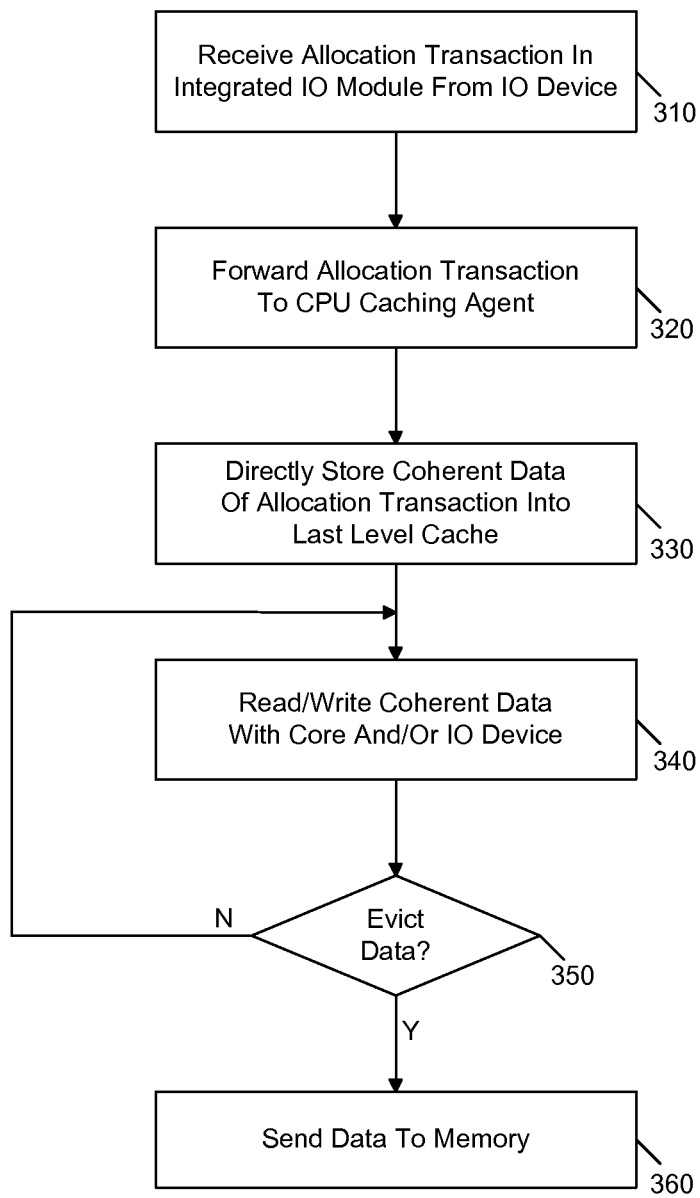
FIG. 3 is a flow diagram of a method in accordance with an embodiment of the present invention.

Referring now to FIG. 3, shown is a flow diagram of a method in accordance with an embodiment of the present invention. As shown in FIG. 3, method 300 may be used to perform allocation of data from an IO device coupled to a multicore processor directly into a cache memory of the processor. More specifically, method 300 of FIG. 3 can be used to insert data into the cache in a manner that avoids both: first providing the data to a system memory coupled to the processor (such as a dynamic random access memory (DRAM)) via an integrated memory controller of the processor; and the need for sending a hint to a core of the processor to cause the data to be requested and stored into the cache.

As seen in FIG. 3, method 300 may begin by receiving an allocation transaction in an IIO module from an IO device (block 310). For example, this allocation transaction can be a request to write data directly into a cache memory, e.g., a LLC of the processor, and it can be received from an IO device such as a peripheral device coupled to the processor via a PCIe™ link, for example. As seen, this allocation transaction can be forwarded from the IIO to a CPU caching agent (block 320). Because in various embodiments there is no separate caching agent for the IIO, this transaction can be directed to a common caching agent that performs caching agent functionality both for processor cores and the IIO.

Responsive to this request, control passes to block 330 where the data can be directly stored into the LLC. In one embodiment, a least recently used (LRU) algorithm can be used to place the data, along with a way mask to restrict the LLC ways that can be allocated to IIO data. More specifically the data can be stored coherently in accordance with a given cache coherency protocol (e.g., a modified exclusive shared invalid (MESI) protocol).

With the data now present in the LLC, it can be accessed a number of times for read and write operations by any of the cores of the processor as well as the initiating IO device or other IO devices coupled to the processor (block 340). Conventional cache coherency protocol operations and compliance with ordering rules can be performed when accessing this data to maintain coherency. During normal cache operation, it can be determined whether the data of this cache line is to be evicted (diamond 350). If so, the data can be written back to memory (block 360). Using method 300 in this way, embodiments provide the ability to efficiently load data from an IO device directly into a processor cache, without the need for consuming any memory bandwidth. Instead it is only upon an eviction from the cache that the data is written to system memory. Although shown with this particular implementation in the embodiment of FIG. 3, understand the scope of the present invention is not limited in this regard.

Various elements both within an IIO module and CPU caching agent can be configured to avoid deadlocks and ensure reasonable performance. First, for PCIe™ ordering rule compliance and in order to sustain performance, a drop ownership indication can be provided by a CPU caching agent to send an indication back to the IIO to drop ownership of a cache line in the case that an external snoop request to an existing ownership request is detected. In contrast, conventional IIO implementation prefetches ownership of a cache line long prior to when the IIO device is read to retire and meet write ordering. Thus the way a conventional IIO works, ownership of a line is acquired before the write of the cache line is ready to commit to the system. Only when write ordering is met will a write to the system occur. During this time, any incoming snoops to the same line will cause the IIO to lose ownership of the line and a request for ownership must be re-issued to obtain the ownership again.

Figure 4:
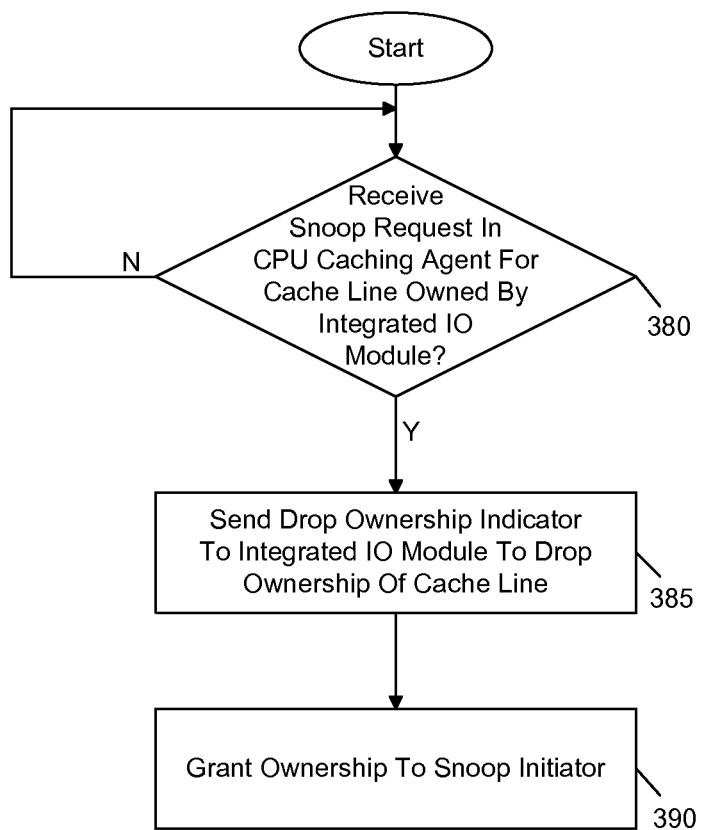
FIG. 4 is a flow diagram of a method in accordance with another embodiment of the present invention.

Referring now to FIG. 4, shown is a flow diagram of a method in accordance with another embodiment of the present invention. As shown in FIG. 4, method 375 can be used to prevent deadlocks by causing an IIO to drop ownership of a given cache line when a conflicting request is received. Specifically as shown in FIG. 4, method 375 may begin by determining that a snoop request is received in a caching agent for a cache line that is owned by an IIO module (diamond 380). This ownership can be based on state information associated with the cache line, e.g., an ownership indicator as well as cache coherency state information, in some embodiments. When such request is received, the caching agent can send a drop ownership indication to the IO module to cause the module to drop ownership of the cache line (block 385). Note that this indication may be because it is likely that the ownership of the cache line by the IIO module is responsive to a prefetch by a coupled IO device and thus the data with regard to the IO device is of a speculative nature and is not yet needed.

As further shown in FIG. 4, control next passes to block 390 where the ownership of the cache line can be granted to the initiator of the snoop. In this way, this requestor can perform desired operations on the data. Then the data may later be accessed by the IO device. Although shown with this particular implementation in the embodiment of FIG. 4, understand the scope of the present invention is not limited in this regard.

Thus by using the above-described mechanism to relinquish the ownership, deadlocks can be avoided. Instead in a conventional system, one can easily imagine that two IIOs in the system may both acquire ownership for the non-oldest transaction and both are bidding for the oldest transaction in order to retire. Unless either side relinquishes the ownership, the system will result in a deadlock.

There are two types of IIO traffic that will be seen by CPU agents, namely posted and non-posted requests, according to a PCIe™ specification, e.g., the PCI Express™ Specification Base Specification version 2.0 (published Jan. 17, 2007) (hereafter the PCIe™ specification). Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data. Posted requests must not be blocked by non-posted requests in the fabrics otherwise a deadlock concern exists. For example, if IIO posted requests that are proxying through the CPU caching agent cannot obtain access to a requested resource to send requests to memory or to a remote IIO, it will prevent any non-posted requests either from the core or IIO from completing, thus creating a deadlock.

Figure 5:
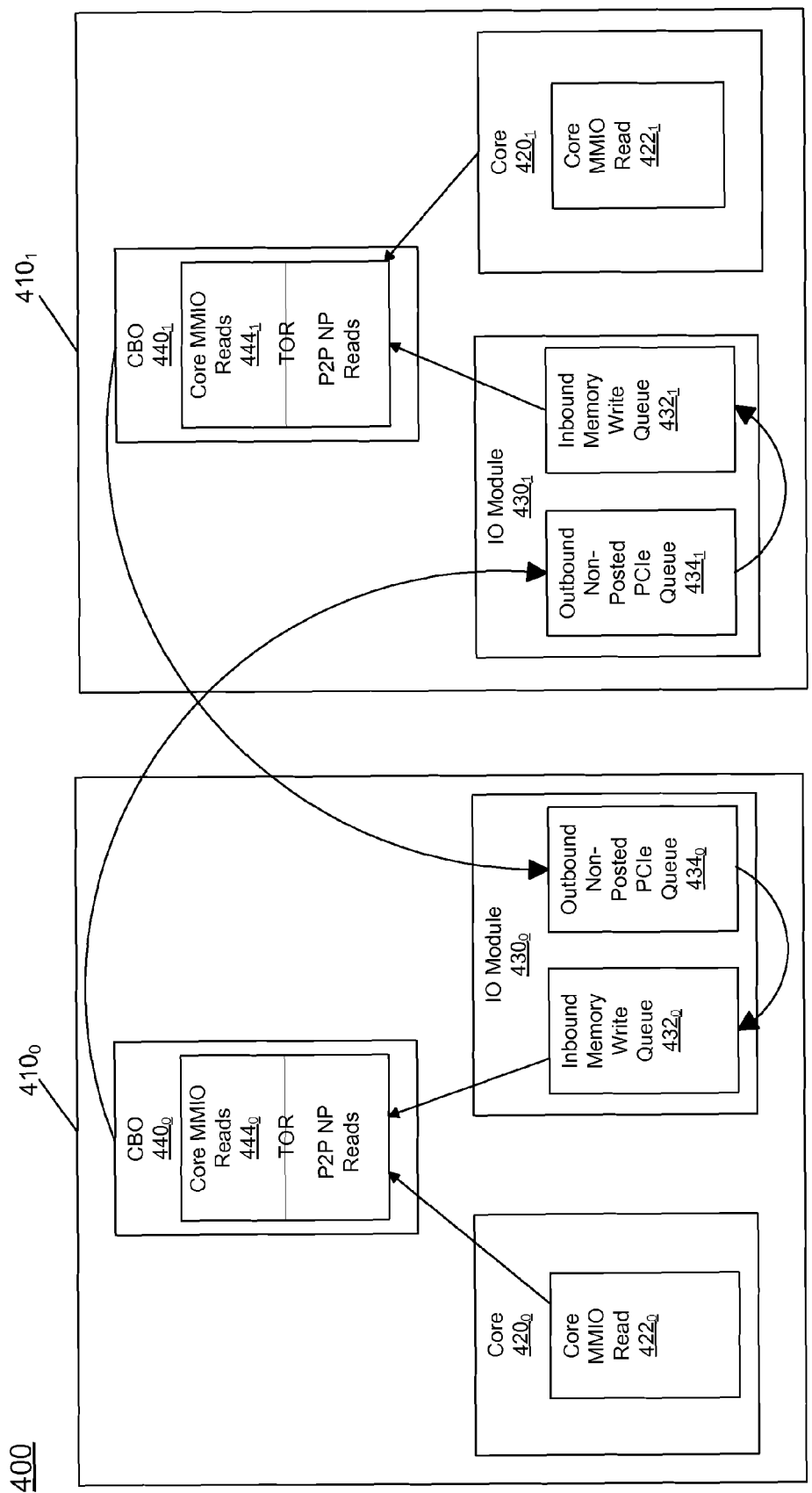
FIG. 5 is a block diagram of an example of a possible deadlock scenario that can be avoided according to various embodiments.

Referring now to FIG. 5, shown is a block diagram of an example of a possible deadlock scenario that can be avoided according to various embodiments. As seen in FIG. 5, system 400 includes a first multicore processor 410$_0$ coupled to a second multicore processor 410$_1$. As seen, each processor includes a corresponding core 420 and an IIO module 430. Of course, multiple cores can be present in different embodiments. In addition, each processor includes a caching agent 440, which acts as the caching agent for both the core and the IIO module. As seen, core 420$_0$ may be issuing non-posted requests, such as core memory mapped IO (MMIO) read requests from a non-posted queue 422$_0$ to a TOR 444$_0$ of caching agent 440$_0$. If these non-posted reads are in front of posted requests, deadlocks may occur.

As further seen, IIO module 430$_0$ includes a posted queue 432$_0$ used to store pending posted requests such as inbound (inbound to the processor) memory write requests as well as a non-posted queue 434$_0$ which may store non-posted requests such as outbound non-posted read requests, e.g., from the processor or another IO agent to the IO device. Thus as seen transactions in write queue 434$_0$ may be ordered after transactions in write queue 432$_0$. By providing a dedicated posted resource within TOR 444, a deadlock situation can be avoided. Note that the PCIe™ ordering rules dictate that posted requests are not blocked by non-posted requests and thus in general write transactions proceed ahead of read transactions.

To avoid such deadlocks, embodiments can configure CPU caching agents appropriately. This configuration includes enabling the CPU caching agent to perform resource reservation and ordering, conflict bypass, and arbitration policy in accordance with an embodiment of the present invention. To this end the CPU caching agent preserves dedicated resources for posted requests, e.g., reserving at least one resource such as an entry of a TOR for a posted request. Embodiments may also ensure the reserved resource is consumed by the "oldest" posted request from the IIO, otherwise a younger request may take up the resource but cannot retire while waiting for the oldest request, which may be stuck in a fabric.

A CPU caching agent in accordance with an embodiment of the present invention can also detect and bypass address conflicts if a posted request were to match an older non-posted request that has the same address, thus providing a conflict bypass. Embodiments may further provide an arbitration policy such that where there is an anti-starvation mechanism in the arbitration scheme within the CPU caching agent, it ensures that the oldest posted request still can make it through the arbitration to avoid a deadlock.

With the above-mentioned configuration of a CPU caching agent, an IIO can be coupled behind a CPU caching agent and benefit from reduced complexity and component count. That is by proxying IIO-related transactions through a CPU caching agent as opposed to having separate dedicated IO agents coupled to a socket via an off-chip link, a better scaling profiling and performance advantages can be realized. Embodiments also potentially increase the possibility of more platform configurations that can be supported. This integration along with low latency route-through (using ring resources) can accommodate various platform configurations.

By reducing the number of caching agents, much less resource division in the system such as home agent tracker entries etc. occurs, and by reducing the amount of snoop overhead due to the number of caching agents in a system, improved scaling/performance can be achieved.

Figure 6:
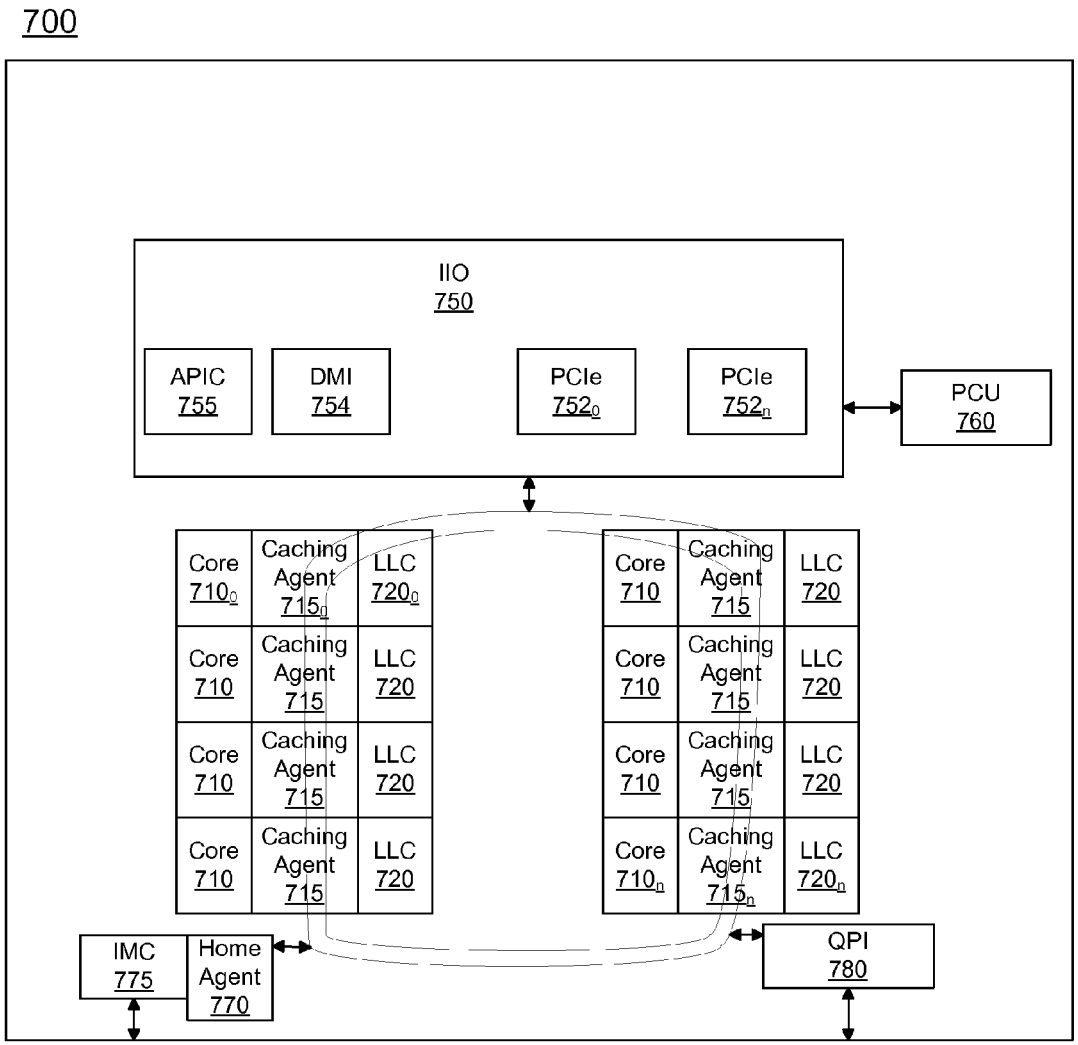
FIG. 6 is a block diagram of a multicore processor in accordance with an embodiment of the present invention.

Referring now to FIG. 6, shown is a block diagram of a multicore processor in accordance with an embodiment of the present invention. As shown in the embodiment of FIG. 6, processor 700 includes a distributed configuration having partitions or slices each including a core 710 and a partition of a caching agent 715 and a LLC 720. Note that while distributed caching agents are shown, understand that these distributed portions form a single caching agent, and which is configured to handle cache coherency operations both for the cores as well as an IIO module 750.

In general, each core 710$_0$-710$_n$ may include low level caches in addition to various execution units and additional processing elements. In turn, the various cores may be coupled to each other and to a shared cache memory formed of a plurality of units of a LLC 740$_0$-740$_n$ via caching agent 715$_0$-715$_n$. In various embodiments, LLC 740 may be shared amongst the cores and IIO module 750. As seen, a ring interconnect 730 thus couples the cores together, and provides interconnection between the cores, caching agent 715 and IIO module 750.

As seen in FIG. 6, IIO module 750 can provide an interface to various off-chip IO/peripheral devices (not shown for ease of illustration in FIG. 6). To this end, IIO module 750 can include various interfaces including multiple PCIe™ interfaces 752$_0$-752$_n$, a direct media interface (DMI) 754, and an IO advance programmable interrupt controller (IO APIC) 755. As seen, IIO module 750 also can be coupled to a power control unit (PCU) 760.

To provide communications with other components of a system, ring interconnect 730 may couple to a home agent 770 that in turn guards an integrated memory controller (IMC) 775. In turn, IMC 775 can communicate, e.g., via DDR links, to a system memory coupled to the processor. Furthermore, a Intel® Quick Path Interconnect (QPI) interface 780 can couple to ring interconnect 730 to act as an interface to another agent (such as another processor in a multiprocessor system) coupled to the processor via a QPI™ link. Although shown with this particular configuration in the embodiment of FIG. 6, understand the scope of the present invention is not limited in this regard.

Figure 7:
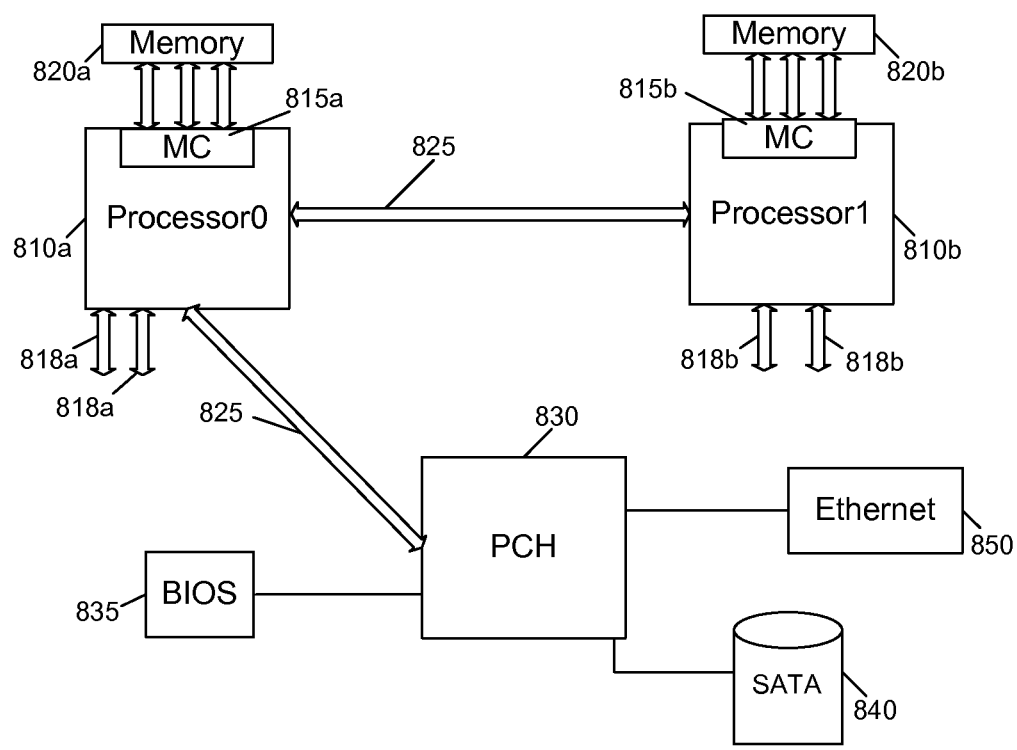
FIG. 7 is a block diagram of a multiprocessor system in accordance with an embodiment of the present invention.

FIG. 7 is a block diagram of a multiprocessor system 800 coupled with point-to-point (PtP) system interconnects in accordance with an embodiment of the present invention. In the embodiment shown, each processor 810 includes one instance of an integrated memory controller 815 that in turn is coupled to a corresponding local portion of a system memory 820, e.g., via various memory links such as double data rate (DDR) channels. As seen, one of the processors is connected to a peripheral controller hub (PCH) 830 via, e.g., DMI and PCIe™ links. In the embodiment shown, a QPI™ link 825 is used to connect the two processors. Note that each of the processors can include an IIO module to provide an interface to one or more off-chip peripheral devices and a single caching agent shared by the IIO module and the cores of the processor. As further seen in FIG. 7, PCH 830 may communicate with various devices including a basic input/output system (BIOS) storage 835 such as a flash memory, a serial advanced technology attach (SATA) device 840 such as a disk drive, and a network interface 850, e.g., an Ethernet device.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores, a shared cache memory, a memory controller to interface with a memory coupled to the processor, an integrated input/output (IIO) module to interface between the processor and an IO device coupled to the processor and a caching agent to perform cache coherency operations for the plurality of cores and the IIO module, wherein the processor is to receive an allocation transaction from the IO device and directly store data of the allocation transaction into the shared cache memory, wherein the caching agent is a single caching agent for the processor and includes a plurality of distributed portions each associated with a corresponding one of the plurality of cores.

2. The processor of claim 1, wherein the plurality of distributed portions of the caching agent are coupled via a ring interconnect.

3. The processor of claim 1, wherein the caching agent includes a table of requests to store pending requests for the plurality of cores and the IIO module.

4. The processor of claim 3, wherein the table of requests includes at least one dedicated entry to store a posted transaction.

5. The processor of claim 1, wherein the shared cache memory comprises a last level cache (LLC) including a plurality of distributed portions each associated with a corresponding one of the plurality of cores.

6. The processor of claim 1, wherein the processor is to directly store the data of the allocation transaction into the shared cache memory without initiation of a memory transaction to the memory.

7. The processor of claim 6, wherein the processor is to write the data of the allocation transaction to the memory responsive to eviction of a cache line including the data.

8. The processor of claim 1, wherein the caching agent is to send a drop ownership indication to the IIO module for a cache line owned by the IIO module for the IO device responsive to receipt of a snoop request in the caching agent for the cache line from another agent.

9. The processor of claim 8, wherein the IO device prefetched the cache line, and another agent is one of the plurality of cores.

10. The processor of claim 1, further comprising a ring interconnect to couple the plurality of cores and the shared cache memory via a caching agent.

11. A non-transitory machine-readable medium having stored thereon instructions, which if performed by a machine cause the machine to perform a method comprising:
receiving an allocation transaction in an integrated input/output (IIO) module of a multicore processor from an IO device coupled to the multicore processor;
forwarding the allocation transaction to a caching agent of the multicore processor to cause the data to be stored into a shared cache memory of the multicore processor, the caching agent shared by a plurality of cores of the multicore processor and the IIO module, wherein the caching agent is a single caching agent for the multicore processor and includes a plurality of distributed portions each associated with a corresponding one of the plurality of cores; and
directly storing the data of the allocation transaction into the shared cache memory of the multicore processor without sending the data to a system memory coupled to the multicore processor.

12. The non-transitory machine-readable medium of claim 11, wherein the method further comprises accessing the data in the shared cache memory via at least one of the plurality of cores of the multicore processor a number of times, without sending a transaction to the system memory.

13. The non-transitory machine-readable medium of claim 11, wherein the method further comprises sending the data to the system memory from the shared cache memory if a cache line including the data is evicted from the shared cache memory, when the cache line includes modified data.

14. The non-transitory machine-readable medium of claim 11, wherein the method further comprises sending a drop ownership indication to the IIO module for a cache line owned by the IIO module responsive to receipt of a snoop request in the caching agent for the cache line from another agent.

15. A system comprising:
a first multicore processor including a first plurality of cores, a first shared cache memory, a first integrated input/output (IIO) module to interface between the first multicore processor and a first plurality of IO devices coupled to the first multicore processor, and a first caching agent to perform cache coherency operations for the first plurality of cores and the first IIO module, wherein the first caching agent is to receive an allocation transaction from the first IIO module and directly store data of the allocation transaction into the first shared cache memory, wherein the first caching agent is a single caching agent for the first multicore processor and includes a plurality of distributed portions each associated with a corresponding one of the first plurality of cores, and the first shared cache memory comprises a last level cache (LLC) including a plurality of distributed portions each associated with a corresponding one of the first plurality of cores;

a second multicore processor including a second plurality of cores, a second shared cache memory, a second IIO module to interface between the second multicore processor and a second plurality of IO devices coupled to the second multicore processor, and a second caching agent to perform cache coherency operations for the second plurality of cores and the second IIO module; and a peripheral controller coupled to at least one of the first and second multicore processors.

16. The system of claim 15, wherein the first caching agent includes a table of requests having a plurality of entries each to store a pending request for one of the first plurality of cores or the first IIO module, including at least one dedicated entry to store a pending request corresponding to a posted transaction.

17. The system of claim 15, wherein the data in the shared cache memory is to be accessed via at least one of the first plurality of cores a number of times, without sending a transaction to a system memory coupled to the first multicore processor.

* * * * *

(12) INTER PARTES REVIEW CERTIFICATE (3945th)

United States Patent
Liu et al.

(10) Number: US 9,575,895 K1
(45) Certificate Issued: Apr. 7, 2025

(54) PROVIDING COMMON CACHING AGENT FOR CORE AND INTEGRATED INPUT/OUTPUT (IO) MODULE

(71) Applicants: Yen-Cheng Liu; Robert G. Blankenship; Geeyarpuram N. Santhanakrishnan; Ganapati N. Srinivasa; Kenneth C. Creta; Sridhar Muthrasanallur; Bahaa Fahim

(72) Inventors: Yen-Cheng Liu; Robert G. Blankenship; Geeyarpuram N. Santhanakrishnan; Ganapati N. Srinivasa; Kenneth C. Creta; Sridhar Muthrasanallur; Bahaa Fahim

(73) Assignee: DAEDALUS PRIME LLC

Trial Number:
IPR2023-01344 filed Aug. 23, 2023

Inter Partes Review Certificate for:
Patent No.: 9,575,895
Issued: Feb. 21, 2017
Appl. No.: 14/609,620
Filed: Jan. 30, 2015

The results of IPR2023-01344 are reflected in this inter partes review certificate under 35 U.S.C. 318(b).

INTER PARTES REVIEW CERTIFICATE
U.S. Patent 9,575,895 K1
Trial No. IPR2023-01344
Certificate Issued Apr. 7, 2025

AS A RESULT OF THE INTER PARTES REVIEW PROCEEDING, IT HAS BEEN DETERMINED THAT:

Claims 1-17 are cancelled.

\* \* \* \* \*